United States Patent
Guo et al.

(10) Patent No.: US 11,657,279 B2
(45) Date of Patent: May 23, 2023

(54) ELECTRONIC DEVICE AND METHOD FOR DOCUMENT SEGMENTATION

(71) Applicant: National Taiwan University of Science and Technology, Taipei (TW)

(72) Inventors: Jing-Ming Guo, Taipei (TW); Li-Ying Chang, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 229 days.

(21) Appl. No.: 17/344,911

(22) Filed: Jun. 10, 2021

(65) Prior Publication Data

US 2021/0390323 A1 Dec. 16, 2021

Related U.S. Application Data

(60) Provisional application No. 63/039,472, filed on Jun. 16, 2020.

(30) Foreign Application Priority Data

Apr. 29, 2021 (TW) ................................. 110115669

(51) Int. Cl.
*G06N 3/08* (2023.01)
*G06N 3/04* (2023.01)
(Continued)

(52) U.S. Cl.
CPC .............. *G06N 3/08* (2013.01); *G06F 18/213* (2023.01); *G06F 18/2193* (2023.01); *G06N 3/04* (2013.01);
(Continued)

(58) Field of Classification Search
CPC .......... G06N 3/08; G06N 3/04; G06V 30/413; G06V 10/454; G06V 10/82; G06V 10/95; G06F 18/2193; G06F 18/213
See application file for complete search history.

(56) References Cited

U.S. PATENT DOCUMENTS 10,467,502 B2   11/2019   Ren et al.
10,579,924 B1*  3/2020   Kim ......................... G06N 3/04
(Continued)

FOREIGN PATENT DOCUMENTS

CN   110991611   4/2020
CN   111242899   6/2020
(Continued)

OTHER PUBLICATIONS

Chen, Liang-Chieh, et al. "Encoder-decoder with atrous separable convolution for semantic image segmentation." Proceedings of the European conference on computer vision (ECCV). 2018. (Year: 2018).*

(Continued)

*Primary Examiner* — Utpal D Shah
(74) *Attorney, Agent, or Firm* — JCIPRNET (57) ABSTRACT

An electronic device and a method for document segmentation are provided. The method includes: obtaining a first feature map and a second feature map corresponding to an original document; performing a first upsampling on the second feature map to generate a third feature map; concatenating the first feature map and the third feature map to generate a fourth feature map; inputting the fourth feature map to a first inverted residual block (IRB) and performing a first atrous convolution operation based on a first dilation rate to generate a fifth feature map; inputting the fourth feature map to a second IRB and performing a second atrous convolution operation based on a second dilation rate to generate a sixth feature map; concatenating the fifth feature map and the sixth feature map to generate a seventh feature map; performing a convolution operation on the seventh feature map to generate a segmented document.

10 Claims, 6 Drawing Sheets

(51) Int. Cl.
| | |
|---|---|
| *G06V 10/94* | (2022.01) |
| *G06V 30/413* | (2022.01) |
| *G06V 10/82* | (2022.01) |
| *G06V 10/44* | (2022.01) |
| *G06F 18/213* | (2023.01) |
| *G06F 18/21* | (2023.01) |

(52) U.S. Cl.
CPC ............ *G06V 10/454* (2022.01); *G06V 10/82* (2022.01); *G06V 10/95* (2022.01); *G06V 30/413* (2022.01)

(56) References Cited

U.S. PATENT DOCUMENTS

| | | | |
|---|---|---|---|
| 10,769,744 B2* | 9/2020 | Poudel Karmatha | G06T 1/0014 |
| 10,830,755 B2 | 11/2020 | Narasimhan et al. | |
| 11,024,037 B2* | 6/2021 | Du | G06V 30/1916 |
| 11,315,253 B2* | 4/2022 | Karmatha | G06T 7/10 |
| 2019/0147318 A1* | 5/2019 | Howard | G06N 3/04 706/27 |
| 2020/0160065 A1 | 5/2020 | Weinzaepfel | |
| 2020/0160083 A1 | 5/2020 | Zhu et al. | |
| 2021/0089807 A1* | 3/2021 | Liu | G06V 10/774 |
| 2021/0248467 A1* | 8/2021 | Mohamed | G06F 9/3455 |
| 2022/0044053 A1* | 2/2022 | Wang | G06V 10/454 |
| 2022/0058429 A1* | 2/2022 | Zou | G06V 10/84 |
| 2022/0198209 A1* | 6/2022 | Spears | G06T 11/203 |
| 2022/0261993 A1* | 8/2022 | Yoo | A61B 5/7267 |
| 2023/0043310 A1* | 2/2023 | Yang | G06N 3/08 |

FOREIGN PATENT DOCUMENTS

| | | |
|---|---|---|
| CN | 111259983 | 6/2020 |
| TW | I653605 | 3/2019 |
| TW | 202014984 | 4/2020 |

OTHER PUBLICATIONS

"Notice of allowance of Taiwan Counterpart Application", dated Jul. 18, 2022, p. 1-p. 5.

Diederik P. Kingma et al., "Auto-Encoding Variational Bayes", arXiv:1312.6114v10 [stat.ML], May 2014, pp. 1-14.

Alec Radford & Luke Metz et al., "Unsupervised Representation Learning with Deep Convolutional Generative Adversarial Networks", Under review as a conference paper at ICLR 2016, Jan. 2016, pp. 1-16.

Phillip Isola et al., "Image-to-Image Translation with Conditional Adversarial Networks", 2017 IEEE Conference on Computer Vision and Pattern Recognition (CVPR), Jul. 2017, pp. 1125-1134.

Olaf Ronneberger, et al., "U-net: Convolutional networks for biomedical image segmentation", Medical image computing and computer-assisted intervention, May 2015, pp. 1-8.

Zhengxin Zhang et al., "Road extraction by deep residual u-net", IEEE Geoscience and Remote Sensing Letters, vol. 15, Issue 5, May 2018, pp. 1-5.

Jie Hu et al., "Squeeze-and-excitation networks", IEEE conference on computer vision and pattern recognition, Jun. 18-23, 2018, pp. 7132-7141.

Liang-Chieh Chen et al., "Deeplab: Semantic image segmentation with deep convolutional nets, atrous convolution, and fully connected crfs", IEEE transactions on pattern analysis and machine intelligence, vol. 40, Issue 4, May 2017, pp. 1-14.

Jo Schlemper et al., "Attention gated networks: Learning to leverage salient regions in medical images", Medical Image Analysis, vol. 53, Feb. 2019, pp. 197-207.

\* cited by examiner

S601: Obtain an original document and a neural network model, wherein the neural network model comprises a first model, and the first model is configured to: obtain a first feature map of a first size and a second feature map of a second size corresponding to the original document, wherein the first size is greater than the second size; perform first upsampling on the second feature map to generate a third feature map of a third size, wherein the third size is equal to the first size; concatenate the first feature map and the third feature map to generate a fourth feature map; input the fourth feature map to a first inverted residual block to generate a first output and perform a first atrous convolution operation on the first output based on a first dilation rate to generate a fifth feature map; input the fourth feature map to a second inverted residual block to generate a second output and perform a second atrous convolution operation on the second output based on a second dilation rate to generate a sixth feature map, wherein the second dilation rate is different from the first dilation rate; concatenate the fifth feature map and the sixth feature map to generate a seventh feature map; and perform a first convolution operation on the seventh feature map to generate a segmented document S603: Output the segmented document

FIG. 6

ELECTRONIC DEVICE AND METHOD FOR DOCUMENT SEGMENTATION

CROSS-REFERENCE TO RELATED APPLICATION

This application claims the priority benefit of U.S. provisional application Ser. No. 63/039,472, filed on Jun. 16, 2020, and Taiwan application serial no. 110115669, filed on Apr. 29, 2021. The entirety of each of the above-mentioned patent applications is hereby incorporated by reference herein and made a part of this specification.

BACKGROUND

Technical Field

The disclosure relates to an electronic device and a method for document segmentation.

Description of Related Art

Document segmentation has been drawing attention in the field of semantic segmentation. Document segmentation may be used to identify and label each object (e.g., text contents, images, or tables) in a document. While various document segmentation methods based on deep learning have been proposed, the results yielded according to these methods are still limited by the amount of computational resources. For example, a convolution neural network with fewer convolution layers may not be able to label objects in a document with sufficient clarity. Therefore, how to develop a document segmentation method capable of yielding favorable results by using reduced computational resources have become an issue to work on.

SUMMARY

The embodiments of the disclosure provide an electronic device and a method for document segmentation. The electronic device and the method are capable of segmenting a document by using a reduced amount of computational resources to generate a segmented document.

An electronic device for document segmentation according to an embodiment of the disclosure includes a processor, a storage medium, and a transceiver. The transceiver receives an original document. The storage medium stores a neural network model. The processor is coupled to the storage medium and the transceiver, and accesses and executes the neural network model. The neural network model includes a first model. The first model is configured to: obtain a first feature map of a first size and a second feature map of a second size corresponding to the original document, wherein the first size is greater than the second size; performing first upsampling on the second feature map to generate a third feature map of a third size, wherein the third size is equal to the first size; concatenating the first feature map and the third feature map to generate a fourth feature map; inputting the fourth feature map to a first inverted residual block (IRB) to generate a first output and performing a first atrous convolution operation on the first output based on a first dilation rate to generate a fifth feature map; inputting the fourth feature map to a second inverted residual block (IRB) to generate a second output and performing a second atrous convolution operation on the second output based on a second dilation rate to generate a sixth feature map, wherein the second dilation rate is different from the first dilation rate; concatenating the fifth feature map and the sixth feature map to generate a seventh feature map; and perform a first convolution operation on the seventh feature map to generate a segmented document. The processor outputs the segmented document via the transceiver.

According to an embodiment of the disclosure, the neural network model further includes a second model, and the second model is configured to: perform second upsampling on the second feature map to generate an eighth feature map of a fourth size, wherein the fourth size is equal to the first size; concatenate the first feature map and the eighth feature map to generate a ninth feature map; and perform a second convolution operation on the ninth feature map to generate an output feature map.

According to an embodiment of the disclosure, the first model corresponds to a first loss function, the second model corresponds to a second loss function, and the processor concatenates the first loss function and the second loss function to generate a third loss function. The processor trains the first model and the second model according to the third loss function.

According to an embodiment of the disclosure, the neural network model further includes an encoding convolution network including a first encoding convolution layer and a second encoding convolution layer. In addition, the encoding convolution network is configured to: generate a first encoding feature map according to the original document and the first encoding convolution layer; and generate a second encoding feature map according to the first encoding feature map and the second encoding convolution layer.

According to an embodiment of the disclosure, the neural network model further includes a decoding convolution network including a first decoding layer and a second decoding layer. The first decoding layer includes the second encoding convolution layer and a decoding convolution layer corresponding to the second encoding convolution layer, and the decoding convolution network is configured to: generate the second feature map according to the second encoding feature map and the first decoding layer; and generate the first feature map according to the second feature map and the second decoding layer.

According to an embodiment of the disclosure, the first model is further configured to: concatenate the first feature map and the third feature map to generate a tenth feature map; and concatenate the tenth feature map, the first feature map, and the third feature map to generate the fourth feature map.

According to an embodiment of the disclosure, the first model is further configured to: concatenate the fifth feature map and the sixth feature map to generate an eleventh feature map; and concatenate the fifth feature map, the sixth feature map, and the eleventh feature map feature map to generate the seventh feature map.

According to an embodiment of the disclosure, the first model is further configured to: perform the first convolution operation on the seventh feature map to generate a twelfth feature map; and input the twelfth feature map into a squeeze-and-excitation network to generate the segmented document.

According to an embodiment of the disclosure, the first encoding convolution layer performs mobile inverted bottleneck convolution on the original document to generate the first encoding feature map.

A method for document segmentation according to an embodiment of the disclosure includes: obtaining an original document and a neural network model including a first model, wherein the first model is configured to: obtain a first feature map of a first size and a second feature map of a second size corresponding to the original document, wherein the first size is greater than the second size; performing first upsampling on the second feature map to generate a third feature map of a third size, wherein the third size is equal to the first size; concatenating the first feature map and the third feature map to generate a fourth feature map; inputting the fourth feature map to a first inverted residual block (IRB) to generate a first output and performing a first atrous convolution operation on the first output based on a first dilation rate to generate a fifth feature map; inputting the fourth feature map to a second inverted residual block (IRB) to generate a second output and performing a second atrous convolution operation on the second output based on a second dilation rate to generate a sixth feature map, wherein the second dilation rate is different from the first dilation rate; concatenating the fifth feature map and the sixth feature map to generate a seventh feature map; and performing a first convolution operation on the seventh feature map to generate a segmented document; and outputting the segmented document.

Based on the above, compared with the conventional document segmentation methods, the framework of the neural network model according to the embodiments of the disclosure is capable of yielding favorable results while consuming reduced computational resources.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Reference will now be made in detail to the present preferred embodiments of the disclosure, examples of which are illustrated in the accompanying drawings. Wherever possible, the same reference numbers are used in the drawings and the description to refer to the same or like parts/steps.

In order to make the disclosure more comprehensible, embodiments are described below as the examples to demonstrate the disclosure. Moreover, elements/components/steps with same reference numerals represent same or similar parts in the drawings and embodiments.

Figure 1:
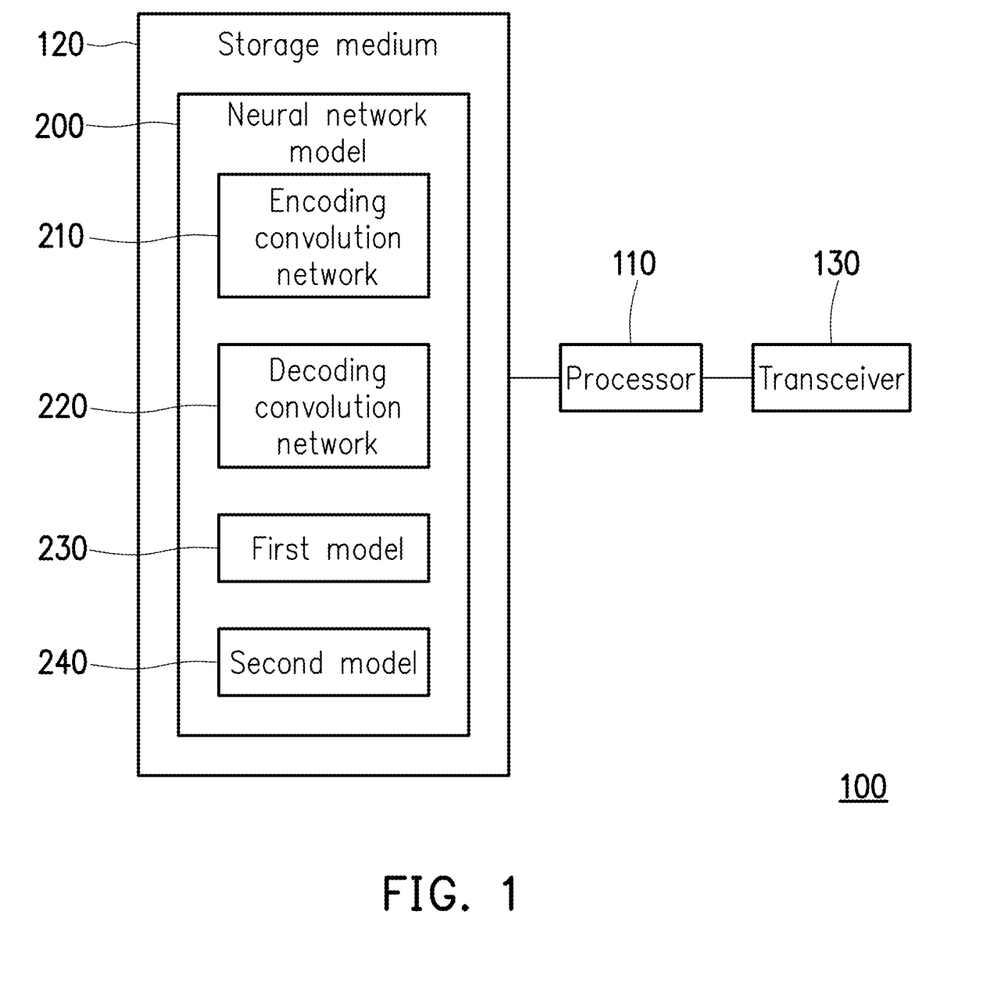
FIG. 1 is a schematic view illustrating an electronic device for document segmentation according to an embodiment of the disclosure.

FIG. 1 is a schematic view illustrating an electronic device 100 for document segmentation according to an embodiment of the disclosure. The electronic device 100 may include a processor 110, a storage medium 120, and a transceiver 130.

The processor 110 may be, for example, a central processing unit (CPU), other programmable general-purpose or specific-purpose micro control units (MCU), a microprocessor, a digital signal processor (DSP), a programmable controller, an application specific integrated circuit (ASIC), a graphics processing unit (GPU), an image signal processor (ISP), an image processing unit (IPU), an arithmetic logic unit (ALU), a complex programmable logic device (CPLD), a field programmable gate array (FPGA), other similar components, or a combination of the aforementioned components. The processor 110 may be coupled to the storage medium 120 and the transceiver 130, and may access and execute multiple modules and various applications stored in the storage medium 120.

The storage medium 120 may be, for example, any type of static or mobile random accessory memory (RAM), read-only memory (ROM), flash memory, hard disk drive (HDD), solid state drive (SSD), similar components, or a combination of the aforementioned components, and configured to store the modules or applications executed by the processor 110. In the embodiment, the storage medium 120 may store a neural network model 200 performing document segmentation on an original document.

The transceiver 130 transmits and receives signals in a wired or wireless manner. The transceiver 130 is also capable of low noise amplification, impedance matching, frequency mixing, up or down frequency conversion, filtering, amplification, and similar operations. The electronic device 100 may receive the original document via the transceiver 130 to perform document segmentation on the original document by using the neural network model in the storage medium 120.

Figure 2:
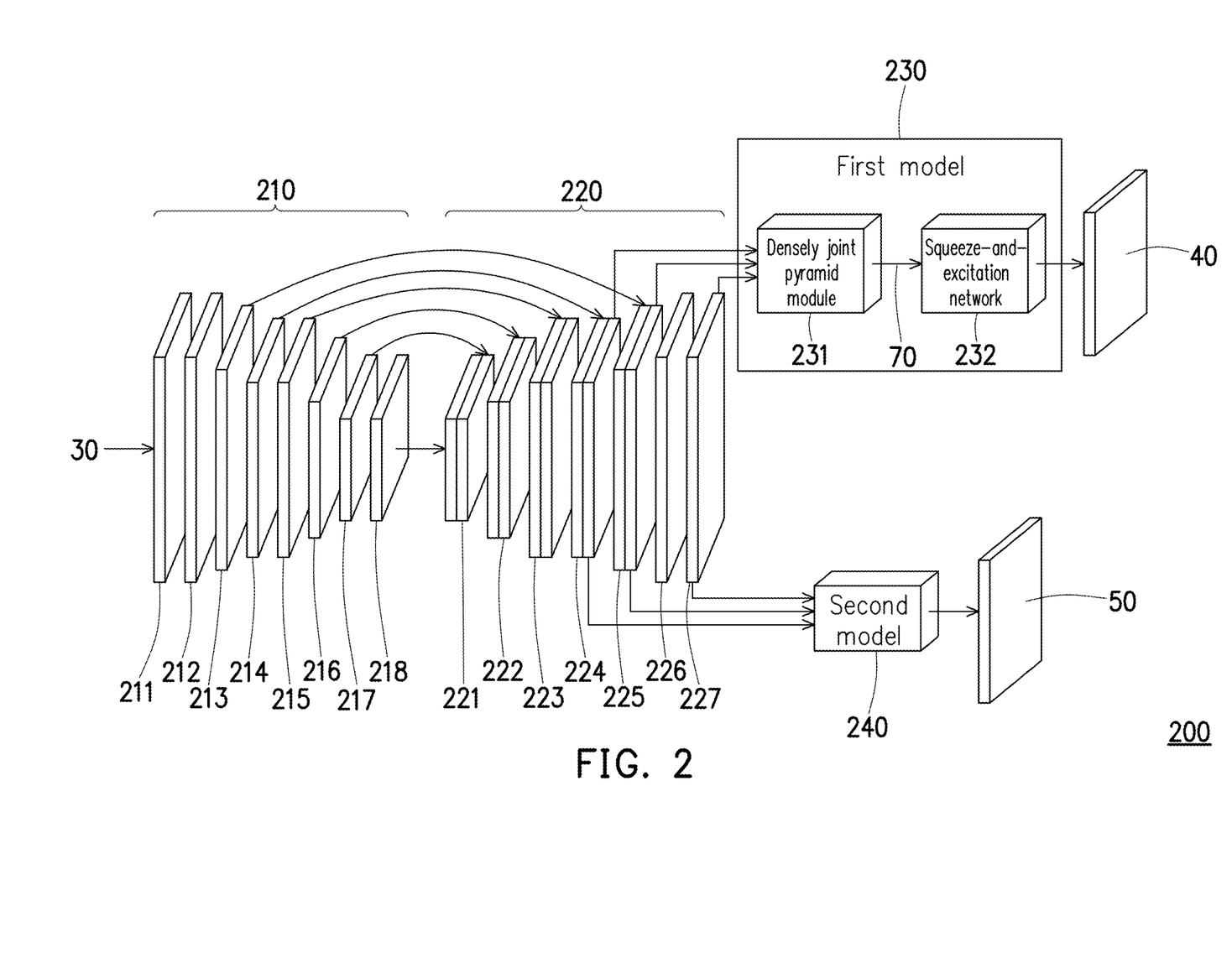
FIG. 2 is a schematic diagram illustrating a neural network model according to an embodiment of the disclosure.
Figure 3:
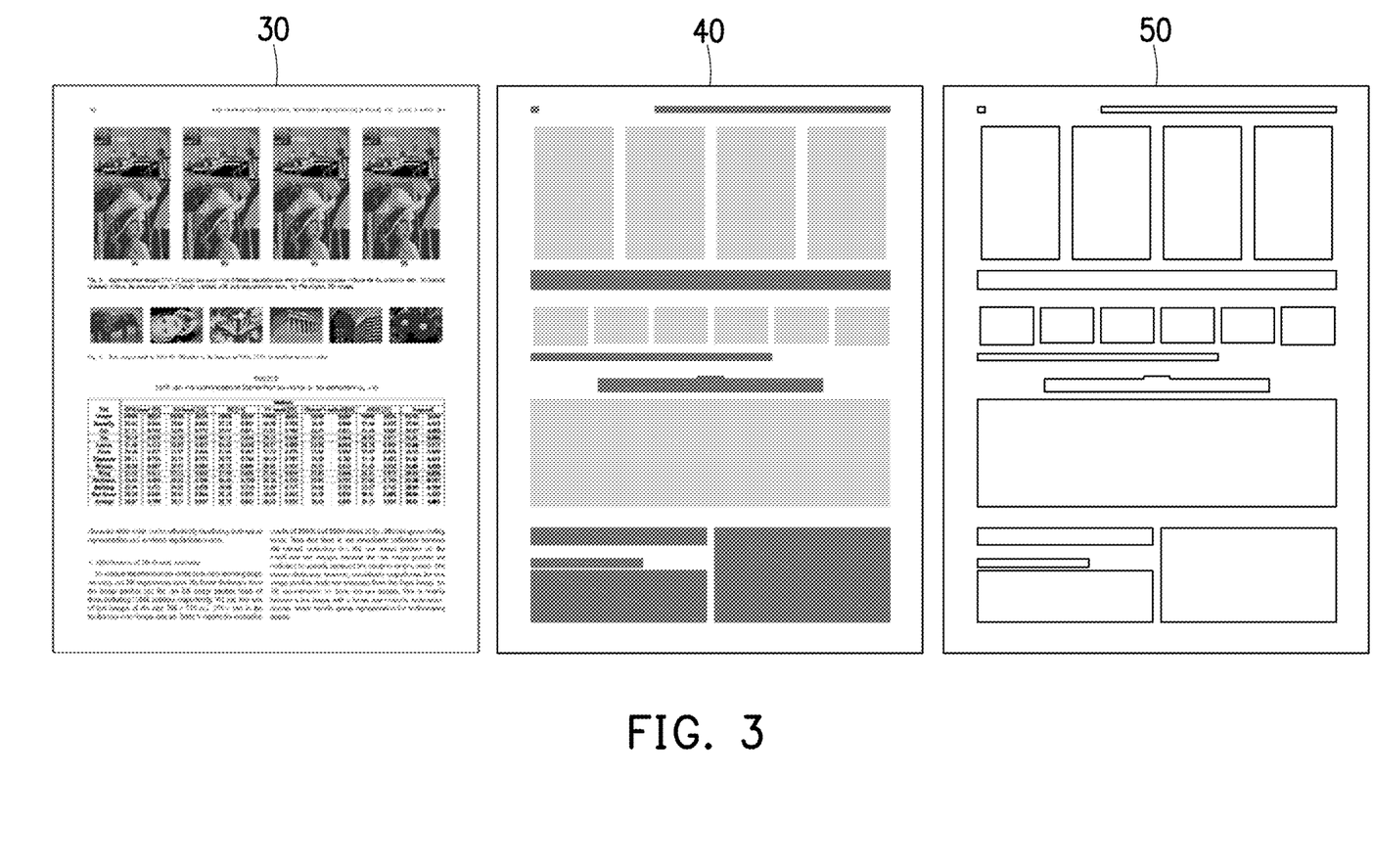
FIG. 3 is a schematic diagram illustrating an original document and a processed document according to an embodiment of the disclosure.

FIG. 2 is a schematic diagram illustrating the neural network model 200 according to an embodiment of the disclosure. The neural network model 200 may include an encoding convolution network 210, an encoding convolution network 220, a first model 230, and a second model 240. In addition, the first model 230 may include a densely joint pyramid module (DJPM) 231. In an embodiment, the first model 230 may further include a squeeze-and-excitation network (SENet) 232. The neural network model 200 may receive an original document 30 and convert the original document 30 into a processed document. FIG. 3 is a schematic diagram illustrating the original document 30 and a processed document according to an embodiment of the disclosure. The processed document may include a segmented document 40 output by the first model 230 and a segmented document 50 output by the second model 240. As shown in FIG. 3, the segmented document 40 (or the segmented document 50) may clearly label different objects in the original document 30. In other words, the document segmentation performance of the neural network model 200 is favorable.

Referring to FIG. 2, the encoding convolution network 210 may include multiple encoding convolution layers. The number of the encoding convolution layers may be adjusted based on needs. The disclosure is not particularly limited in this regard. In the embodiment, the encoding convolution network 210 may include an encoding convolution layer 211, an encoding convolution layer 212, an encoding convolution layer 213, an encoding convolution layer 214, an encoding convolution layer 215, an encoding convolution layer 216, an encoding convolution layer 217, and an encoding convolution layer 218.

The encoding convolution layer 211 may receive the original document 30 and perform a convolution operation on the original document 30 to generate an encoding feature map. The encoding convolution layer 212 may receive the encoding feature map output by the encoding convolution layer 211 and perform a convolution operation on the encoding feature map output by the encoding convolution layer 211 to generate a new encoding feature map. In a similar manner, the encoding convolution layer in the encoding convolution network 210 may receive the encoding feature map output by the previous encoding convolution layer and generate a new encoding feature map according to the received encoding feature map. After the convolution operations of multiple encoding convolution layers, the encoding convolution layer 218 may perform a convolution operation on the encoding feature map output by the encoding convolution layer 217 to generate a new encoding feature map.

The multiple encoding convolution layers in the encoding convolution network 210 may correspond to different sizes. In other words, the encoding feature maps output by different encoding convolution layers may have different sizes. For example, the size of the encoding feature map output by the encoding convolution layer 211 may be different from the size of the encoding feature map output by the encoding convolution layer 212. The encoding convolution network 210 may capture important features of the original document 30 in multiple temporal or spatial scales by using the encoding convolution layers of different sizes.

In an embodiment, the multiple encoding convolution layers in the encoding convolution network 210 may be mobile inverted bottleneck convolution (MBConv) layers. Taking the encoding convolution layer 211 as an example, the encoding convolution layer 211 may perform a mobile inverted bottleneck convolution (MBConv) operation on the original document 30 to generate the encoding feature map. Taking the encoding convolution layer 212 as an example, the encoding convolution layer 212 may perform a mobile inverted bottleneck convolution (MBConv) operation on the encoding feature map output by the encoding convolution layer 211 to generate a new encoding feature map.

The decoding convolution network 220 may include multiple decoding layers. The number of the decoding layers may be adjusted based on needs. The disclosure is not particularly limited in this regard. In the embodiment, the number of the multiple decoding layers may be the number of the multiple encoding convolution layers in the encoding convolution network 210 minus 1. The decoding convolution network 220 may include a decoding layer 221, a decoding layer 222, a decoding layer 223, a decoding layer 224, a decoding layer 225, a decoding layer 226, and a decoding layer 227.

One or more decoding layers in the decoding convolution network 220 may correspond to one or more encoding convolution layers in the encoding convolution network 210. In the embodiment, the decoding layer 221 may correspond to the encoding convolution layer 217. The decoding layer 222 may correspond to the encoding convolution layer 216. The decoding layer 223 may correspond to the encoding convolution layer 215. The decoding layer 224 may correspond to the encoding convolution layer 214. The decoding layer 225 may correspond to the encoding convolution layer 213. The decoding layer 226 may correspond to the encoding convolution layer 212. The decoding layer 227 may correspond to the encoding convolution layer 211.

In the decoding convolution network 220, one or more decoding layers in a distance closer to the encoding convolution network 210 (i.e., one or more decoding layers in a distance closer to the input end of the encoding convolution network 210) may include an encoding convolution layer. The encoding convolution layer in the decoding layer may be located at the input end or the output end of the decoding layer. The decoding layer may be a concatenation between the encoding convolution layer and the decoding convolution layer corresponding to the encoding convolution layer. The concatenation serves to compensate the loss caused when the decoding convolution layer restores data. During data restoration, the decoding convolution layer perform the restoration operation based on the minimum size. Therefore, details in data may be lost. Thus, in the embodiment of the disclosure, the concatenation between the encoding convolution layer and the decoding convolution layer is adopted to compensate the loss of details. In the embodiment, the decoding layer 221 may be the concatenation between the encoding convolution layer 217 and the decoding convolution layer corresponding to the encoding convolution layer 217. The decoding layer may 222 may be the concatenation between the decoding convolution layer corresponding to the encoding convolution layer 216 and the encoding convolution layer 216. The decoding layer may 223 may be the concatenation between the decoding convolution layer corresponding to the encoding convolution layer 215 and the encoding convolution layer 215. The decoding layer may 224 may be the concatenation between the decoding convolution layer corresponding to the encoding convolution layer 214 and the encoding convolution layer 214. The decoding layer may 225 may be the concatenation between the decoding convolution layer corresponding to the encoding convolution layer 213 and the encoding convolution layer 213. The decoding layer 226 may include only an encoding convolution layer corresponding to the encoding convolution layer 212. The decoding layer 227 may include only an encoding convolution layer corresponding to the encoding convolution layer 211.

The decoding layer 221 may receive the encoding feature map output from the convolution encoding layer 218, and perform a deconvolution operation on the encoding feature map to generate a new feature map. The decoding layer 222 may receive the feature map output from the decoding layer 221, and perform a deconvolution operation on the feature map output by the decoding layer 221 to generate a new feature map. In a similar manner, the decoding layer in the decoding convolution network 220 may receive the feature map output by the previous decoding layer and generate a new feature map according to the received feature map. After the deconvolution operations of multiple decoding layers, the decoding layer 227 may perform a deconvolution operation on the feature map output by the decoding layer 226 to generate a new feature map.

The multiple decoding layers in the decoding convolution network 220 may correspond to different sizes. In other words, the feature maps output by different decoding layers may have different sizes. For example, the size of the feature map output by the decoding layer 221 may be different from the size of the feature map output by the decoding layer 222. The decoding convolution network 220 may capture important features of the original document 30 in multiple temporal or spatial scales by using the decoding layers of different sizes.

In an embodiment, the multiple decoding layers in the decoding convolution network 220 may be mobile inverted bottleneck convolution (MBConv) layers. Taking the decoding layer 221 as an example, the decoding layer 221 may perform a mobile inverted bottleneck convolution (MBConv) operation on the feature map output by the encoding convolution layer 218 to generate a new feature map. Taking the decoding layer 222 as an example, the decoding layer 222 may perform a mobile inverted bottleneck convolution (MBConv) operation on the feature map output by the decoding layer 221 to generate a new feature map.

Figure 4:
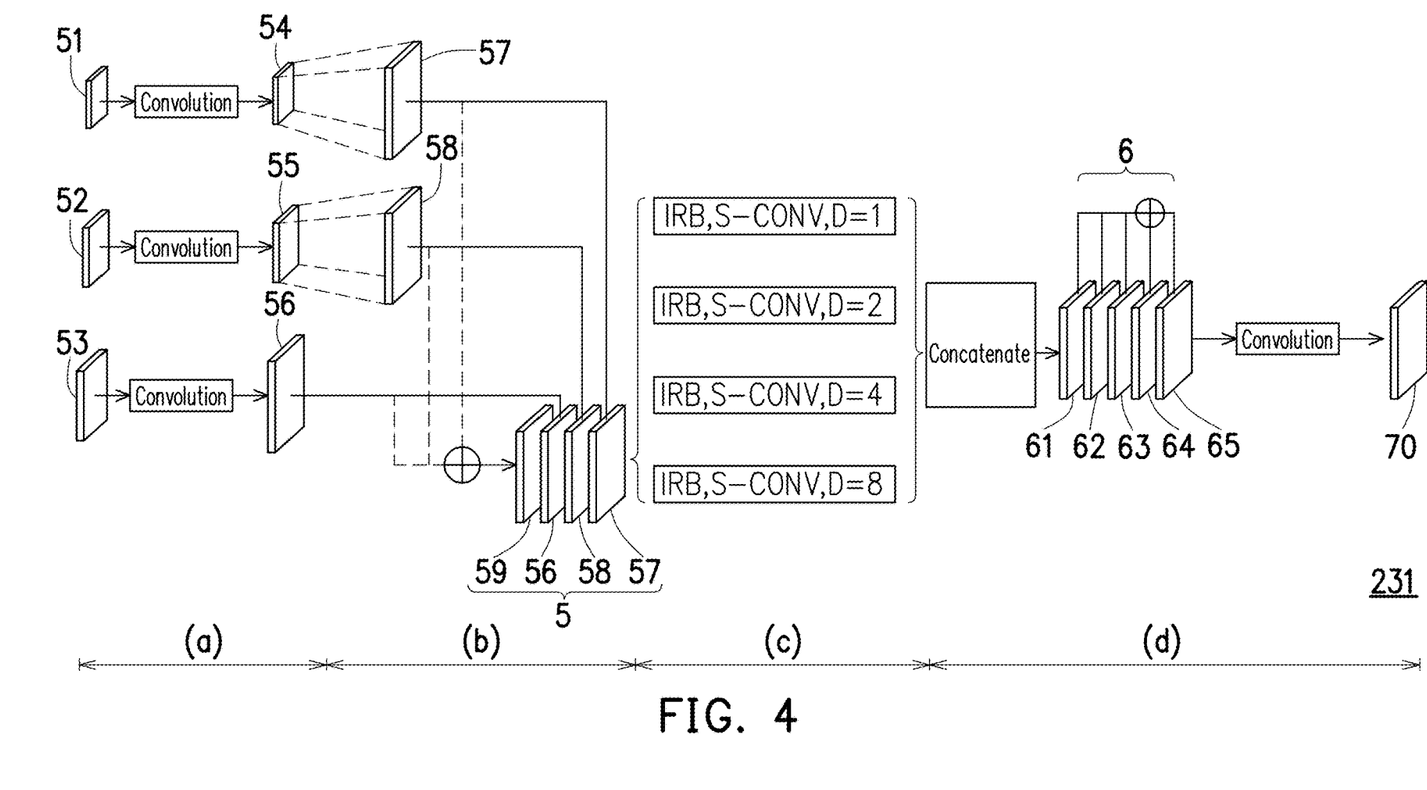
FIG. 4 is a schematic diagram illustrating a process of generating a segmented document by using a densely joint pyramid module according to an embodiment of the disclosure.

The first model 230 may be a neural network. For example, the first model 230 may be a context segmentation network. The densely joint pyramid module 231 of the first model may generate a segmented document corresponding to the original document 30 according to outputs of one or more decoding layers in the decoding convolution network 220. FIG. 4 is a schematic diagram illustrating a process of generating a segmented document 70 by using the densely joint pyramid module 231 according to an embodiment of the disclosure. Specifically, in a process (a), the densely joint pyramid module 231 may obtain one or more feature maps output by one or more decoding layers in a distance closer to the densely joint pyramid module 231 in the decoding convolution network 220 (i.e., one or more decoding layers in a distance closer to the output end of the encoding convolution network 220). The one or more decoding layers may include the decoding layer closest to the densely joint pyramid module 231 (i.e., the decoding layer 227 generating the output of the decoding convolution network 220). Then, the densely joint pyramid module 231 may respectively perform the convolution operation on the obtained feature map to generate a new feature map.

In the embodiment, the densely joint pyramid module 231 may respectively obtain a feature map 53, a feature map 52, and a feature map 51 from the decoding layer 227, the decoding layer 225, and the decoding layer 224. The size of the feature map 53 may be greater than the size of the feature map 52, and the size of the feature map 52 may be greater than the size of the feature map 51. The densely joint pyramid module 231 may perform a convolution operation on the feature map 51, the feature map 52, and the feature map 53 to respectively generate a feature map 54, a feature map 55, and a feature map 56. The size of the feature map 56 may be greater than the size of the feature map 55, and the size of the feature map 55 may be greater than the feature map 54.

In order for the sizes of the feature maps to be consistent, in a process (b), the densely joint pyramid module 231 may upsample a feature map of a smaller size. In the embodiment, the densely joint pyramid module 231 may upsample the feature map 54 to generate a feature map 57. The feature map 57 has the same size as the size of the feature map 56. The densely joint pyramid module 231 may upsample the feature map 55 to generate a feature map 58 having the same size as that of the feature map 56.

Then, the densely joint pyramid module 231 may concatenate the respective feature maps of the same size to generate a new feature map. The densely joint pyramid module 231 may concatenate the feature map generated according to each feature map and the each feature map to generate a new feature map. Assuming that the densely joint pyramid module 231 is to concatenate N+1 (N being a positive integer) feature maps, the densely joint pyramid module 231 may concatenate the N+1 feature maps according to the feature maps generated according to the respective feature maps in the order of the feature map corresponding to a decoder layer in a first distance from the first model 230, the feature map corresponding to a decoder layer in a second distance from the first model 230, . . . , the feature map corresponding to a decoder layer in an $N^{th}$ distance from the first model 230. The first distance may be shorter than the second distance, and the second distance may be shorter than the $N^{th}$ distance. In the embodiment, the densely joint pyramid module 231 may concatenate the feature maps 56, 57, and 58 to generate a feature map 59. Then, the densely joint pyramid module 231 may sequentially concatenate the feature map 59, the feature map 56, the feature map 58, and the feature map 57 to generate a feature map 5.

In a process (c), the densely joint pyramid module 231 may input the feature map to an inverted residual block (IRB) to dilate the compensation for the spatial information of the original document. The densely joint pyramid module 231 may perform an atrous convolution operation or a separable convolution (S-CONV) operation on the output of the inverted residual block based on different dilation rates to generate multiple feature maps. In the embodiment, the densely joint pyramid module 231 may input the feature map 5 to the inverted residual block and perform the atrous convolution operation on the output of the inverted residual block based on a deflation rate 1 (D=1), a deflation rate 2 (D=2), a deflation rate 4 (D=4), and a deflation rate 8 (D=8) to generate four feature maps, i.e., feature maps 61, 62, 63, and 64. That is, the feature map 61 corresponds to the deflation rate 1, the feature map 62 corresponds to the deflation rate 2, the feature map 63 corresponds to the deflation rate 4, and the feature map 64 corresponds to the deflation rate 8.

In a process (d), the densely joint pyramid module 231 may concatenate the respective feature maps of the same size to generate a new feature map. The densely joint pyramid module 231 may concatenate each feature map and the feature map generated according to the each feature map to generate a new feature map. In the embodiment, the densely joint pyramid module 231 may concatenate the feature maps 61, 62, 63, and 64 to generate a feature map 65. Then, the densely joint pyramid module 231 may sequentially concatenate the feature map 61, the feature map 62, the feature map 63, the feature map 64, and the feature map 65 to generate a feature map 6. The densely joint pyramid module 231 perform a convolution operation on the feature map 6 to generate the segmented document 70. The processor 110 may output the segmented document 70 through the transceiver 130.

In an embodiment, the first model 230 may further input the segmented document 70 output by the densely joint pyramid module 231 to the squeeze-and-excitation network 232 to enhance the features of the segmented document 70. The squeeze-and-excitation network 232 may generate a segmented document 40 according to the segmented document 70. The processor 110 may output the segmented document 40 through the transceiver 130.

Figure 5:
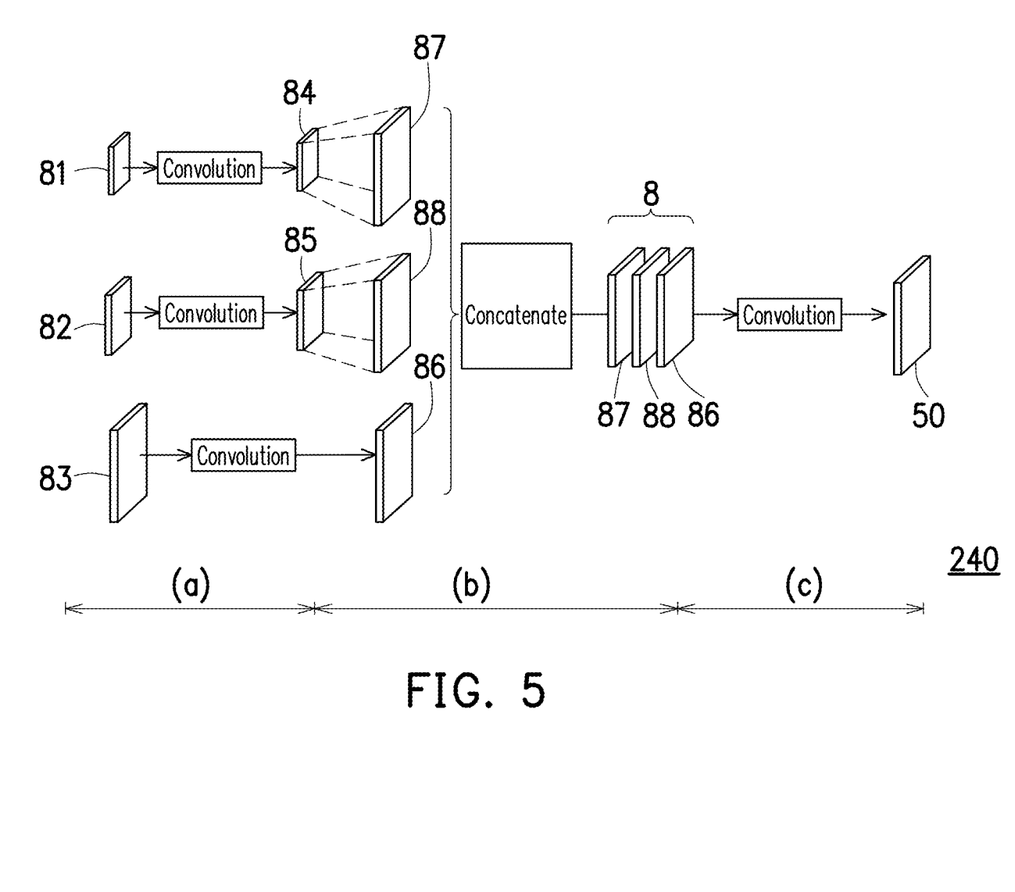
FIG. 5 is a schematic diagram illustrating a process of generating a segmented document by using a second model according to an embodiment of the disclosure.

The second model 240 may be a neural network. For example, the second model 240 may be an edge supervision network. The second model 240 may generate a segmented document corresponding to the original document 30 according to the output of one or more decoding layers in the decoding convolution network 220. FIG. 5 is a schematic diagram illustrating a process of generating the segmented document 50 by using the second model 240 according to an embodiment of the disclosure. Specifically, in a process (A), the second model 240 may obtain one or more feature maps output by one or more decoding layers in a distance closer to the second model 240 in the decoding convolution network 220 (i.e., one or more decoding layers in a distance closer to the output end of the decoding convolution network 220). The one or more decoding layers may include the decoding layer closest to the second model 240 (i.e., the decoding layer 227 generating the output of the decoding convolution network 220). Then, the second model 240 may respectively perform the convolution operation on the obtained feature map to generate a new feature map.

In the embodiment, the second model 240 may respectively obtain a feature map 83, a feature map 82, and a feature map 81 from the decoding layer 227, the decoding layer 225, and the decoding layer 224. The size of the feature map 83 may be greater than the size of the feature map 82, and the size of the feature map 82 may be greater than the size of the feature map 81. In an embodiment, the feature map 81, the feature map 82, and the feature map 83 may be respectively the same as the feature map 51, the feature map 52, and the feature map 53. The second model 240 may perform the convolution operation on the feature map 51, the feature map 52, and the feature map 53 to generate a feature map 84, a feature map 85, and a feature map 86. The size of the feature map 86 may be greater than the size of the feature map 85, and the size of the feature map 85 may be greater than the feature map 84.

In order for the sizes of the feature maps to be consistent, in a process (B), the second model 240 may upsample a feature map of a smaller size. In the embodiment, the second model 240 may upsample the feature map 58 to generate a feature map 87. The feature map 87 has the same size as the size of the feature map 86. The second model 240 may upsample the feature map 85 to generate a feature map 88 having the same size as that of the feature map 86.

Then, the second model 240 may concatenate the respective feature maps of the same size to generate a new feature map. Assuming that the second model 240 intends to concatenate M (M being a positive integer) feature maps, the second model 240 may concatenate the M feature maps according to the order of the feature map corresponding to a decoder layer in a first distance from the second model 240, the feature map corresponding to a decoder layer in a second distance from the second model 240, . . . , the feature map corresponding to a decoder layer in an $M^{th}$ distance from the second model 240. The first distance may be greater than the second distance, and the second distance may be greater than the $M^{th}$ distance. In the embodiment, the second module 240 may sequentially concatenate the feature map 87, the feature map 88, and the feature map 86 to generate a feature map 8.

In a process (C), the second model 240 may perform a convolution operation on the feature map 8 to generate a feature map 50. The processor 110 may output the feature map 50 through the transceiver 130.

A loss function L of the neural network model 200 is as shown in the following, wherein L1 represents a loss function of the first model 230, L2 represents a loss function of the second model 240, n represents the quantity of training data, m represents the number of classes, $\hat{y}_{ij}$ represents a prediction result corresponding to an $i^{th}$ training data and a $j^{th}$ class, and $y_{ij}$ is a ground-truth corresponding to the $i^{th}$ training data and the $j^{th}$ class. The processor 110 may train the neural network model 200 according to the loss function L to adjust the hyperparameters of the encoding convolution network 210, the decoding convolution network 220, the first model 230, and/or the second model 240, thereby optimizing the performance of the neural network model 200.

$$L = L1 + L2$$

$$L1 = -\sum_{i=1}^{n}(y_{i1}\log(\hat{y}_{i1}) + \ldots + y_{im}\log(\hat{y}_{im}))$$

$$L2 = \frac{1}{n}\sum_{i=1}^{n}(y_{i1} - \hat{y}_{i1})^2$$

Figure 6:
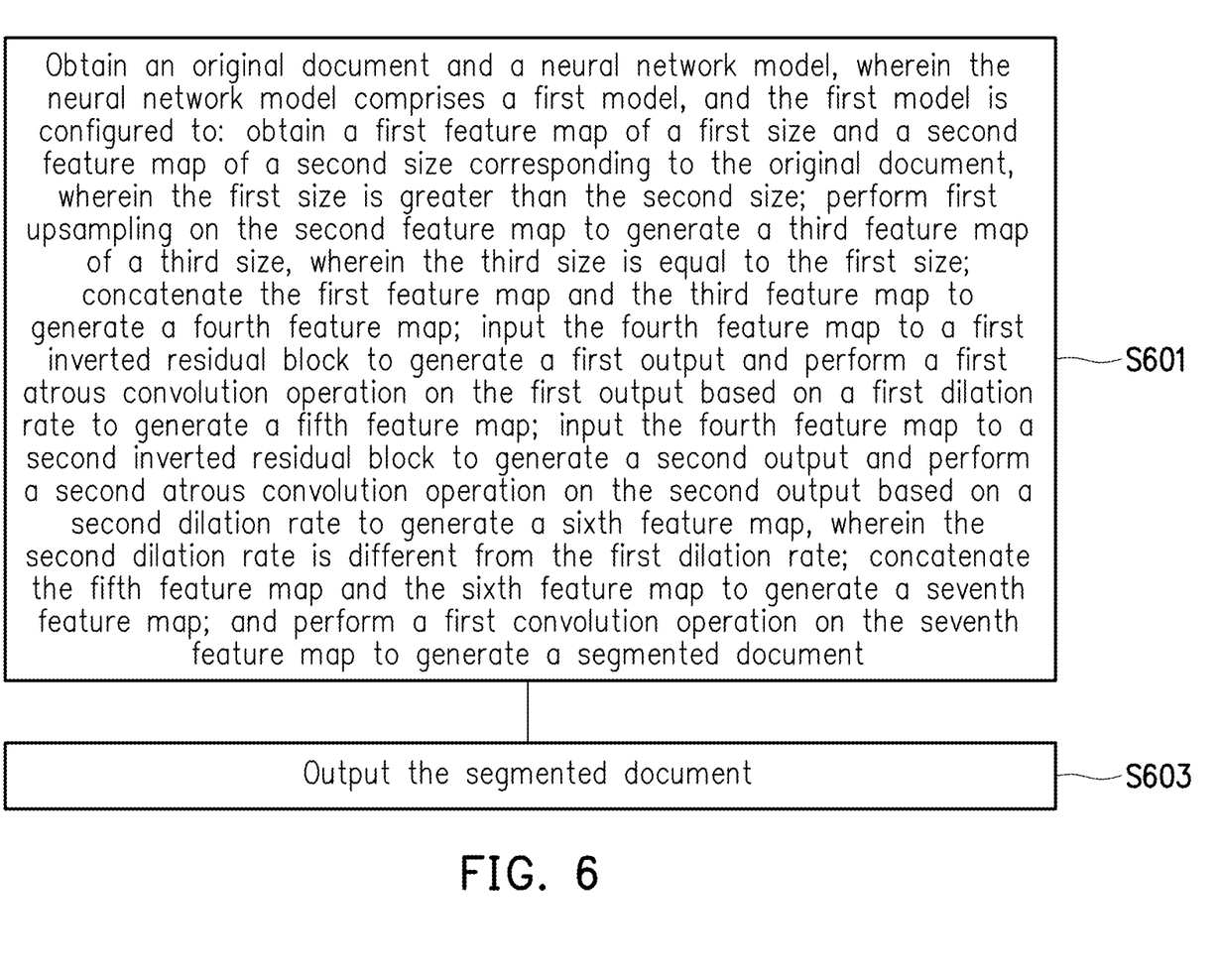
FIG. 6 is a flowchart illustrating a method for document segmentation according to an embodiment of the disclosure.

FIG. 6 is a flowchart illustrating a method for document segmentation according to an embodiment of the disclosure. The method may be carried out by the electronic device 100 shown in FIG. 1. In Step S601, an original document and a neural network model is obtained. The neural network model includes a first model, and the first model is configured to: obtain a first feature map of a first size and a second feature map of a second size corresponding to the original document, wherein the first size is greater than the second size; perform first upsampling on the second feature map to generate a third feature map of a third size, wherein the third size is equal to the first size; concatenate the first feature map and the third feature map to generate a fourth feature map; input the fourth feature map to a first inverted residual block (IRB) to generate a first output and perform a first atrous convolution operation on the first output based on a first dilation rate to generate a fifth feature map; input the fourth feature map to a second inverted residual block (IRB) to generate a second output and perform a second atrous convolution operation on the second output based on a second dilation rate to generate a sixth feature map, wherein the second dilation rate is different from the first dilation rate; concatenate the fifth feature map and the sixth feature map to generate a seventh feature map; and perform a first convolution operation on the seventh feature map to generate a segmented document. In Step S603, the segmented document is output.

In view of the foregoing, the neural network model according to the embodiments of the disclosure is capable of generating multiple feature maps through capturing features of the original document by using the encoding convolution network and the decoding convolution network. The first model may concatenate multiple feature maps to generate a feature map including important features of the original document in multiple temporal or spatial scales. The first model may further increase the channel number of the feature maps by using the inverted residual block and the atrous convolution operation to compensate the spatial information of the original document. Meanwhile, in the embodiments of the disclosure, the hyperparameters in the neural network model may be trained according to the loss functions of the first model and the second model. As a result, the trained neural network model may exhibit favorable performance. The framework of the neural network model according to the embodiments of the disclosure is capable of generating an accurate document segmentation result while consuming fewer computational resources.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. An electronic device for document segmentation, comprising:
   a transceiver, receiving an original document;
   a storage medium, storing a neural network model; and
   a processor, coupled to the storage medium and the transceiver, and accessing and executing the neural network model, wherein the neural network model comprises a first model, and the first model is configured to:
      obtain a first feature map of a first size and a second feature map of a second size corresponding to the original document, wherein the first size is greater than the second size;
      perform first upsampling on the second feature map to generate a third feature map of a third size, wherein the third size is equal to the first size;
   concatenate the first feature map and the third feature map to generate a fourth feature map;
      input the fourth feature map to a first inverted residual block to generate a first output and perform a first atrous convolution operation on the first output based on a first dilation rate to generate a fifth feature map;
      input the fourth feature map to a second inverted residual block to generate a second output and perform a second atrous convolution operation on the second output based on a second dilation rate to generate a sixth feature map, wherein the second dilation rate is different from the first dilation rate;
      concatenate the fifth feature map and the sixth feature map to generate a seventh feature map; and
      perform a first convolution operation on the seventh feature map to generate a segmented document,
   wherein the processor outputs the segmented document via the transceiver.

2. The electronic device as claimed in claim 1, wherein the neural network model further comprises a second model, and the second model is configured to:
   perform second upsampling on the second feature map to generate an eighth feature map of a fourth size, wherein the fourth size is equal to the first size;
   concatenate the first feature map and the eighth feature map to generate a ninth feature map; and
   perform a second convolution operation on the ninth feature map to generate an output feature map.

3. The electronic device as claimed in claim 2, wherein the first model corresponds to a first loss function, the second model corresponds to a second loss function, and the processor concatenate the first loss function and the second loss function to generate a third loss function, wherein the processor trains the first model and the second model according to the third loss function.

4. The electronic device as claimed in claim 1, wherein the neural network model further comprises an encoding convolution network comprising a first encoding convolution layer and a second encoding convolution layer, and the encoding convolution network is configured to:
   generate a first encoding feature map according to the original document and the first encoding convolution layer; and
   generate a second encoding feature map according to the first encoding feature map and the second encoding convolution layer.

5. The electronic device as claimed in claim 4, wherein the neural network model further comprises a decoding convolution network comprising a first decoding layer and a second decoding layer, the first decoding layer comprises the second encoding convolution layer and a decoding convolution layer corresponding to the second encoding convolution layer, and the decoding convolution network is configured to:
   generate the second feature map according to the second encoding feature map and the first decoding layer; and
   generate the first feature map according to the second feature map and the second decoding layer.

6. The electronic device as claimed in claim 1, wherein the first model is further configured to:
   concatenate the first feature map and the third feature map to generate a tenth feature map; and
   concatenate the tenth feature map, the first feature map, and the third feature map to generate the fourth feature map.

7. The electronic device as claimed in claim 1, wherein the first model is further configured to:
   concatenate the fifth feature map and the sixth feature map to generate an eleventh feature map; and
   concatenate the fifth feature map, the sixth feature map, and the eleventh feature map feature map to generate the seventh feature map.

8. The electronic device as claimed in claim 1, wherein the first model is further configured to:
   perform the first convolution operation on the seventh feature map to generate a twelfth feature map; and
   input the twelfth feature map into a squeeze-and-excitation network to generate the segmented document.

9. The electronic device as claimed in claim 4, wherein the first encoding convolution layer performs mobile inverted bottleneck convolution on the original document to generate the first encoding feature map.

10. A method for document segmentation, comprising:
    obtaining an original document and a neural network model comprising a first model, wherein the first model is configured to:
       obtain a first feature map of a first size and a second feature map of a second size corresponding to the original document, wherein the first size is greater than the second size;
       perform first upsampling on the second feature map to generate a third feature map of a third size, wherein the third size is equal to the first size;
    concatenate the first feature map and the third feature map to generate a fourth feature map;
       input the fourth feature map to a first inverted residual block to generate a first output and perform a first atrous convolution operation on the first output based on a first dilation rate to generate a fifth feature map;
       input the fourth feature map to a second inverted residual block to generate a second output and perform a second atrous convolution operation on the second output based on a second dilation rate to generate a sixth feature map, wherein the second dilation rate is different from the first dilation rate;
       concatenate the fifth feature map and the sixth feature map to generate a seventh feature map; and
       performing a first convolution operation on the seventh feature map to generate a segmented document; and
    outputting the segmented document.

* * * * *